United States Patent [19]

Mühle

[11] Patent Number: 4,592,123

[45] Date of Patent: Jun. 3, 1986

[54] DEVICE FOR MANUFACTURING THERMO-INSULATED COMPOUND PROFILES FOR WINDOWS, DOORS AND FACADES

[76] Inventor: Manfred Mühle, D-4972 Löhne 2, Fed. Rep. of Germany

[21] Appl. No.: 662,302

[22] PCT Filed: Jan. 16, 1984

[86] PCT No.: PCT/DE84/00008

§ 371 Date: Sep. 21, 1984

§ 102(e) Date: Sep. 21, 1984

[87] PCT Pub. No.: WO84/02861

PCT Pub. Date: Aug. 2, 1984

[30] Foreign Application Priority Data

Jan. 25, 1983 [DE] Fed. Rep. of Germany ....... 3302274

[51] Int. Cl.[4] .............................................. B23P 11/00

[52] U.S. Cl. .................................................. 29/243.5

[58] Field of Search ........................... 29/243.5, 243.52

[56] References Cited

U.S. PATENT DOCUMENTS 1,976,148 10/1934 Sonntag ............................ 29/243.5

4,188,705 2/1980 Jackson ................................. 29/509

4,194,284 3/1980 Diels et al. ......................... 29/243.5

4,245,384 1/1981 Egerer ............................... 29/243.5

4,470,186 9/1984 Knudsen ............................. 29/243.5

FOREIGN PATENT DOCUMENTS 3033309 4/1982 Fed. Rep. of Germany .

*Primary Examiner*—James L. Jones, Jr.

*Attorney, Agent, or Firm*—Max Fogiel

[57] ABSTRACT

An arrangement for manufacturing thermo-insulated compound profiles for windows, doors and facades, in which metal profiles to be joined for forming a compound profile, have at least one longitudinal groove. Insulating connecting webs are secured in this groove. Press rollers are located opposite one another in pairs at right angles to the profile axis, and press on the outer sides of the connecting webs against retaining strips. These retaining strips bound the longitudinal groove of the metal profiles. The press rollers press together the retaining strips and base of the connecting webs. One of the press rollers has at least two forming discs which can be displaced in a dependent manner in a plane of the roller. The discs are also supported on a hub of the roller.

8 Claims, 4 Drawing Figures

DEVICE FOR MANUFACTURING THERMO-INSULATED COMPOUND PROFILES FOR WINDOWS, DOORS AND FACADES

The invention relates to a device for manufacturing thermo-insulated compound profiles for windows, doors and facades, wherein metal profiles to be joined to form the compound profile are provided with at least one longitudinal groove in which are secured insulating connecting webs, while press rollers, located opposite one another in pairs at right angles to the profile axis press on the outer sides of the connecting webs against the retaining strips bounding the longitudinal grooves of the metal profiles, and press together these retaining strips and the base of the connecting webs engaged in the longitudinal grooves.

A known device of the above-mentioned type follows from German Auslegeschrift No. 2, 727, 060. The design described therein also uses press rollers located opposite one another in pairs for pressing the metal profiles, to be joined to form a compound profile, and connecting webs together, the press rollers being pressed against one another either by means of pneumatic cylinders or by spring force. If production tolerancies which cannot be avoided arise at the metal profiles, then although the press rollers can yield under the force of the cylinder or the compression springs, they do so under the disadvantage that this causes a non-uniform pressure distribution on the retaining strips of the two metal profiles. Consequently, the press joint, and in this respect the strength of the compound profile, between each of the metal profiles and the connecting webs is impaired.

As a consequence of the prior art referred to, it is the object of the invention, despite existing production tolerancies of the metal profiles to be joined, to always achieve an equally large pressure distribution of the press rollers on the retaining strips and consequently to uniformly secure the connecting webs in the profile grooves.

To achieve the said object, a device having the characteristics indicated in the Patent Claims is proposed.

The advantage achieved by the invention is that a press roller, formed from at least two forming discs, which can be displaced non-positively and inter-dependently in the roller plane and are supported on the roller hub, can always compensate for all dimensional deviations occuring at the metal profile in such a way that the same pressure force is exerted on all of the retaining strips of the metal profiles to be pressed together with the connecting webs. In this way, quality differences in the compound profiles manufactured by the device according to the invention are avoided; this was not possible with earlier machines. These aspects are of special importance for processing large profile sections, because the production tolerancies increase with profile width.

An embodiment example of the invention is described with reference to the drawings, wherein in detail;

Figure 1:
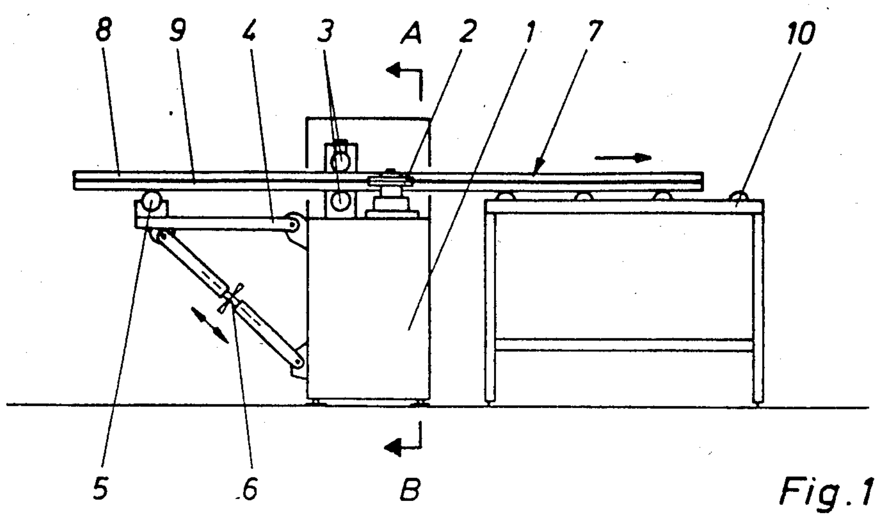
FIG. 1 shows a side view of a production device according to the invention.

FIG. 1 shows a production device, which is provided with press rollers 2, located opposite one another in pairs on the machine frame 1, and a horizontal guide roller pair 3 acting at right angles to the direction of pressure of the press rollers 2. Located at the end of a support arm 4 extending from the machine frame 1 is a support roller 5 located downstream from the horizontal guide roller pair 3, the vertical position of which support roller 5 can be varied by means of a spindle adjustor 6 for determining the position of the metal profiles 8 and 9 to be joined to form the compound profile 7. The finished compound profile 7 leaving the press rollers 2 is drawn off over a roller table 10.

Figure 2:
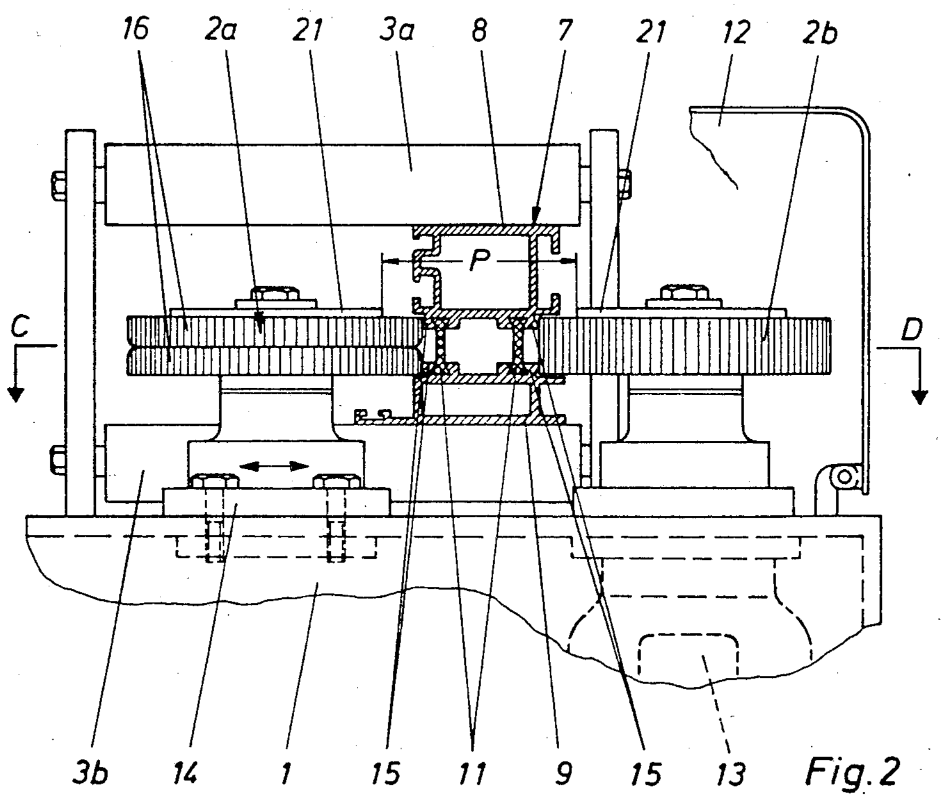
FIG. 2 shows a partial section drawn to an enlarged scale running along section line A-B in FIG. 1.

FIG. 2 clearly shows in detail how the device shown in FIG. 1 is constructed. It can be seen from FIG. 2 that the metal profiles 8 and 9 forming the compound profile 7 are joined together by thermo-insulating connecting webs 11 by securing the connecting webs 11, each of which engage by means of a base in longitudinal grooves of the metal profiles 8 and 9, in the longitudinal grooves. The press rollers 2*a* and 2*b* rotatably mounted on both sides of the profile axis behind a safety guard 12 are used for this purpose, of which press rollers 2*a* and 2*b*, one press roller 2*b* is set in rotation by a driving motor 13, whereas the second press roller 2*a* opposite the press roller 2*b* is not driven directly with the latter. The bearing block 14 of press roller 2*a* can be moved on the machine frame 1 in a transverse direction to the compound profile 7, so that its distance from the press roller 2*b* can be adapted manually or by a spindle (not shown) to the respective dimensions of the metal profiles 8 and 9, which are fed between the guide rollers 3*a* and 3*b* located horizontally one above the other, the upper guide roller 3*a* of which is flexibly mounted or elastically encased. Both press rollers 2*a* and 2*b*, which are preferably hardened, press on the outer side of the connecting webs 11 against the retaining strips 15 bounding the longitudinal grooves of the metal profiles 8 and 9 in order to press the retaining strips 15 and the connecting webs 11 together.

Figure 3:
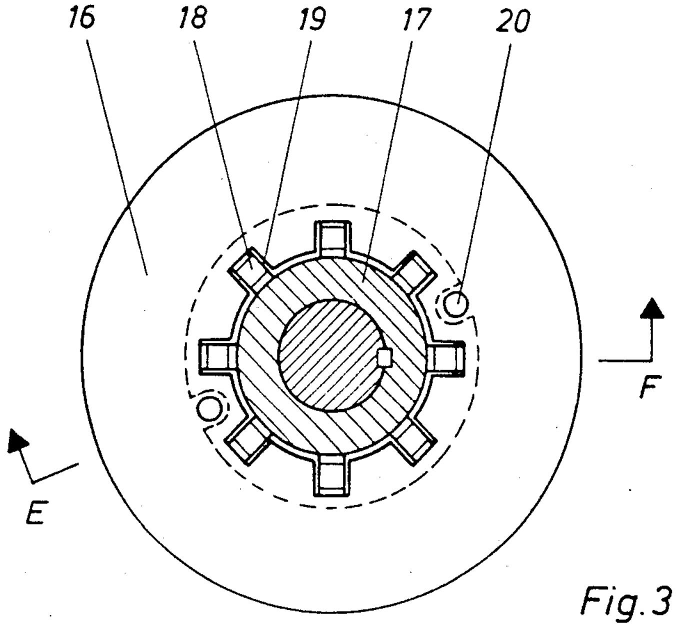
FIG. 3 shows a horizontal section, through section line C-D of the press roller in FIG. 2 sub-divided into two forming discs.
Figure 4:
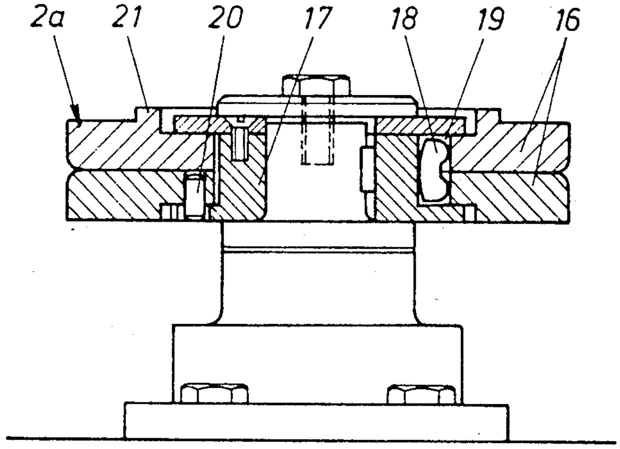
FIG. 4 shows the vertical section E-F in FIG. 3 of this press roller formed by two forming discs.

So that the same pressing power is always appplied to the retaining strips 15, taking into account production tolerancies of the metal profiles 8 and 9, the press roller 2*a* comprises two forming rollers 16, which in accordance with FIGS. 3 and 4 can be displaced non-positively and inter-dependently in the roller plane and are supported on the roller hub 17. The latter is achieved by means of tilting pads 18 distributed uniformly at the periphery of the roller hub 17, the tilting pads 18 being mounted in radial recesses 19 of the forming discs 16, with a drive pin 20 of the roller hub 17 engaging in one of the forming discs 16.

To be able to exactly set before the start of production the forming dimension of the compound profile to be produced, the press rollers 2*a* and 2*b* have a control shoulder 21. The mutual spacing of these control shoulders 21 represents the forming dimension P pertaining to each compound profile 7, the specified size of which forming dimension P being used to determine the position of the moveable press roller 2*a* on the machine frame 1. The production properties of the device according to the invention are also substantially improved by this measure.

I claim:

1. Device for manufacturing thermo-insulated compound profiles for windows, doors and facades, comprising: metal profiles to be joined for forming a compound profile with at least one longitudinal groove; insulating connecting webs with a base and secured in said groove; press rollers located opposite one another in pairs at right angles to an axis of said profiles; retaining strips bounding longitudinal grooves of said metal profiles, said press rollers pressing on outer sides of said connecting webs against said retaining strips; said press rollers pressing together said retaining strips and said base of said connecting webs; one of said press rollers comprising a roller hub and at least two forming discs displaceable dependently on each other in a plane of said roller, said discs being supported on said roller hub.

2. Device as defined in claim 1, including tilting pads distributed uniformly on the periphery of said roller hub for supporting said forming discs on said hub.

3. Device as defined in claim 2, wherein said tilting pads are mounted in radial recesses in said forming discs; and a drive pin on said roller hub engaging in at least one of said forming discs.

4. Device as defined in claim 1, wherein said press rollers have a control shoulder for setting a forming dimension associated with each compound profile to be produced.

5. Device as defined in claim 1, wherein said press rollers are spaced in a variable arrangement.

6. Device as defined in claim 1, including a guide roller pair acting at right angles to the direction of pressure applied by said press rollers; and a vertically adjustable support roller mounted axially parallel at a substantially large distance in front of said guide roller pair, said guide roller pair and said support roller being arranged downstream from said press rollers for determining the position of said metal profiles and said connecting webs.

7. Device as defined in claim 6, wherein one roller of said guide roller pair arranged downstream from said press rollers is flexibly mounted.

8. Device as defined in claim 6, wherein one roller of said guide roller pair is elastically encased.

* * * * *